United States Patent [19]
Franke

[11] Patent Number: 6,108,220
[45] Date of Patent: Aug. 22, 2000

[54] SOLID STATE FAIL-SAFE CONTROL OF AN AC LOAD UTILIZING SYNCHRONOUS SWITCHING

[75] Inventor: Raymond C. Franke, Glenshaw, Pa.

[73] Assignee: Union Switch & Signal, Inc., Pittsburgh, Pa.

[21] Appl. No.: 09/027,378

[22] Filed: Feb. 20, 1998

[51] Int. Cl.[7] .................................................. H02M 5/458
[52] U.S. Cl. .................................. 363/37; 363/71; 363/97
[58] Field of Search ............................. 363/34, 370, 65, 363/71, 95, 97, 98

[56] References Cited

U.S. PATENT DOCUMENTS

| | | | |
|---|---|---|---|
| 4,894,763 | 1/1990 | Ngo | 363/35 |
| 4,987,347 | 1/1991 | Leskovec et al. | 315/209 |
| 5,053,939 | 10/1991 | Kirchberg et al. | 363/37 |
| 5,123,746 | 6/1992 | Okado | 363/98 |
| 5,163,172 | 11/1992 | Hakala | 363/37 |
| 5,283,727 | 2/1994 | Kheraluwala et al. | 363/98 |
| 5,367,229 | 11/1994 | Yang | 315/324 |
| 5,412,557 | 5/1995 | Lauw | 363/37 |
| 5,483,140 | 1/1996 | Hess et al. | 363/34 |
| 5,504,667 | 4/1996 | Janaka et al. | 363/37 |
| 5,767,591 | 6/1998 | Pinkerton | 363/34 |
| 5,808,881 | 9/1998 | Lee | 363/97 |
| 5,844,788 | 12/1998 | Lin | 363/37 |

*Primary Examiner*—Jeffrey Sterrett
*Attorney, Agent, or Firm*—Michael D. Lazzara; David V. Radack; Eckert Seamans Cherin & Mellott, LLC

[57] ABSTRACT

The vital driver utilizes rectification and subsequent synchronized inverting of the rectified power, which is then fed to a transformer. Failed operation, which permits current having a DC component to reach the load transformer, causes an increase in the current which is sensed by a current sensor. The high current can be detected by a fuse. Some embodiments use primary modules having a rectifier section with sufficient power to run a number of secondary units, each powering an individual load. The synchronizing inverter can utilize optically coupled solid state switches.

20 Claims, 7 Drawing Sheets

SOLID STATE FAIL-SAFE CONTROL OF AN AC LOAD UTILIZING SYNCHRONOUS SWITCHING

BACKGROUND OF THE INVENTION

This invention relates to a vital driver, where the term "vital" is understood to have its meaning as utilized by those skilled in the art of railway signaling. Generally "vital" means that should components fail, the device is left in a non-operative state, so as not to signal an erroneous condition. As can be understood, where the driver is used to provide a source of power to a lamp, it is desirable that in a vital device should a component fail, the lamp is left unlit, as opposed to remaining lit which may signal a condition that does not, in fact, exist. It has been common practice to use a vital relay as a driver for lamp loads in the railway signal industry. Vital relays are well known and are sophisticated electromechanical devices in which should the relay fail, the contacts operate in a way to open the circuit and interrupt power to the light bulb. Some of the disadvantages of utilizing vital relays are size, costly and the fact that relays are mechanically operated. Vital relays become especially costly and bulky where a large number of lamps are to be driven in a given location. It would, therefore, be desirable if large racks of vital relays used for lamp-driving application could be replaced with smaller solid-state devices having a considerably reduced footprint. Various contact interlocking schemes with vital relays can be used for obtaining different levels of vitality. It is, therefore, desirable to have a relatively simple low-cost small solid-state device that can act in a vital manner to power loads such as lamps. Typically, it is desired to operate the lamps with a sinusoidal AC current, while providing a control signal that is low voltage DC. The lamps that are to be driven will generally operate from a lower voltage AC, and it is common to use step-down lamp transformers to obtain low voltage AC power.

SUMMARY OF THE INVENTION

The invention provides for rectifying an AC source into a pulsating DC signal. A full wave rectifier can be used. The rectified sine wave is then fed into an inverter which reconstructs an AC output. The AC output is fed to the primary windings of a load transformer. The load transformer feeds the load, such as a lamp. Other loads are also contemplated. The inverter can utilize switches in a bridge configuration. The switches are synchronized to the AC source. Two pairs of switches alternate between on states to reconstruct a sine wave output. Vitality is achieved when component failures causing the output to have a DC component. The transformer primary will have a reduced impedance to waveforms having a DC component, and results in a current rise in the circuit. Increased current is sensed and the driver turned off in response to a high current level. Current sensing and shutdown can be implemented through a blown fuse. The procedure of rectifying, inverting, and sensing current increases are utilized to provide a method of vitally driving loads. The inverting can be done utilizing synchronized switching, which is controlled by an AC signal from the AC incoming power. The driver responds to a control signal, indicating that the load is to be powered up. Some embodiments of the invention can utilize a common rectifier section, which supplies a plurality of secondary units. Other embodiments utilize a primary unit that has a full-rated rectifier and one-half of the inverting circuits. Such primary unit is used to drive a number of secondary units which can have lower power ratings specifically matching the individual load in that secondary unit.

DETAILED DESCRIPTION OF SOME EMBODIMENTS

Figure 1A:
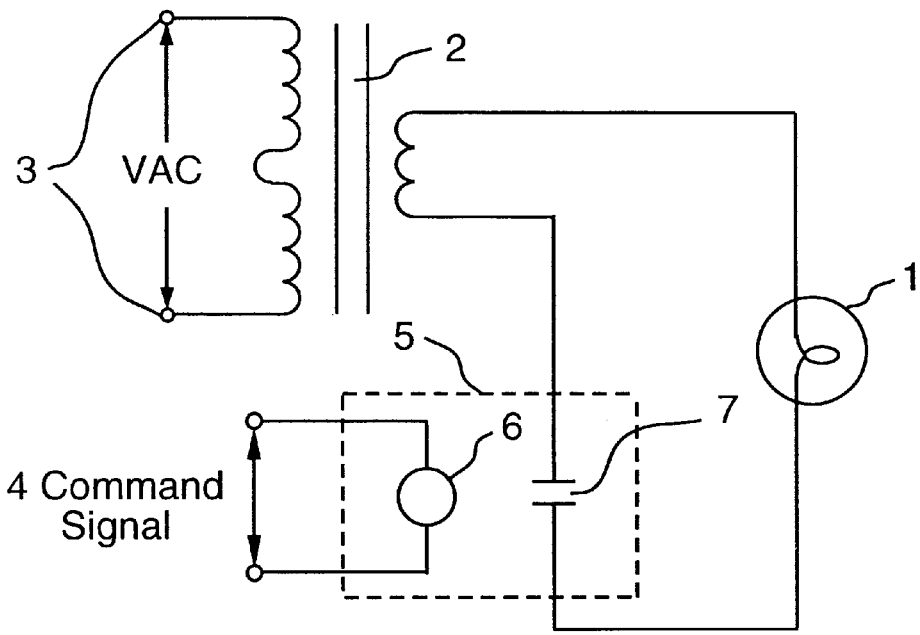
FIG. 1a shows a prior art circuit diagram of a lamp driver.
Figure 1B:
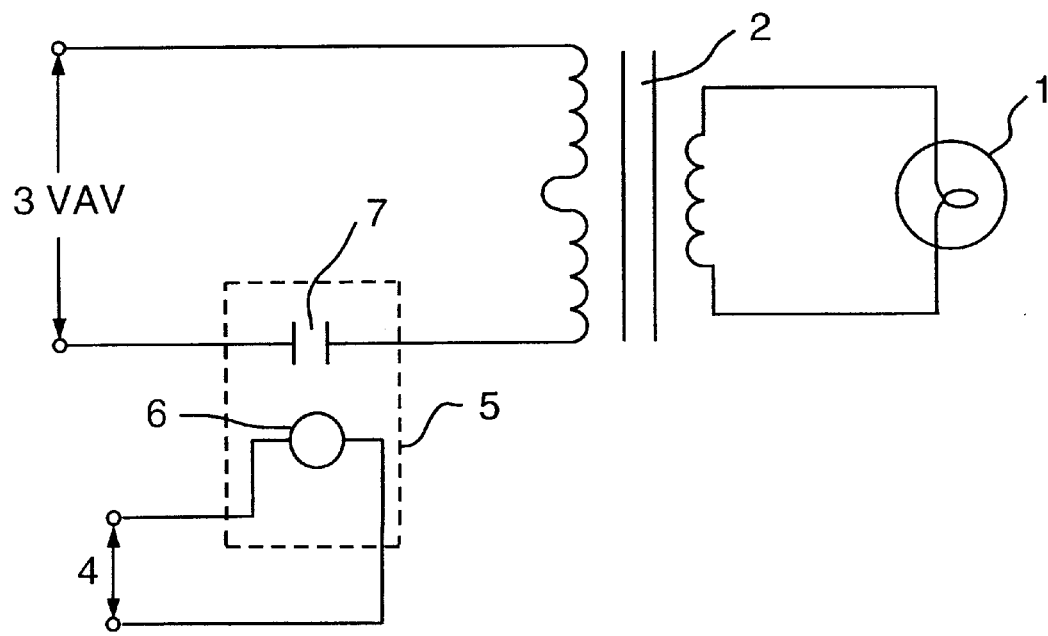
FIG. 1b shows a prior art circuit for a lamp driver.

FIG. 1 a shows a prior art device used as a railway signal lamp driver. The device is considered vital in that it uses a vital relay 5. In this circuit, a source of AC power 3, is delivered to a transformer 2. The output of the transformer 2 is connected in a series circuit with a lamp filament 1 and a contact 7 from vital relay 5. A command signal, such as a low voltage DC signal, is applied to the coil 6 of the vital relay at command signal inputs 4. It is a simple interlocking scheme utilizing the vital relay contacts in the secondary or low voltage side of the transformer 2 FIG. 1b shows a similar scheme in which the contact 7 of vital relay 5 is placed in the primary side of the transformer 2. Both of these circuits show a single normally open contact. It is understood that in other prior art vital relay driver circuits, other contacts or other arrangements of contacts have been utilized. Such circuits using vital relays have been utilized for many years and are effective for this purpose. However, the cost, complexity and maintenance of relays is usually desired to be avoided. These circuits are effective because they are both vital and utilize a minimum number of components. However, vital relays have certain undesirable cost and size characteristics.

Figure 2:
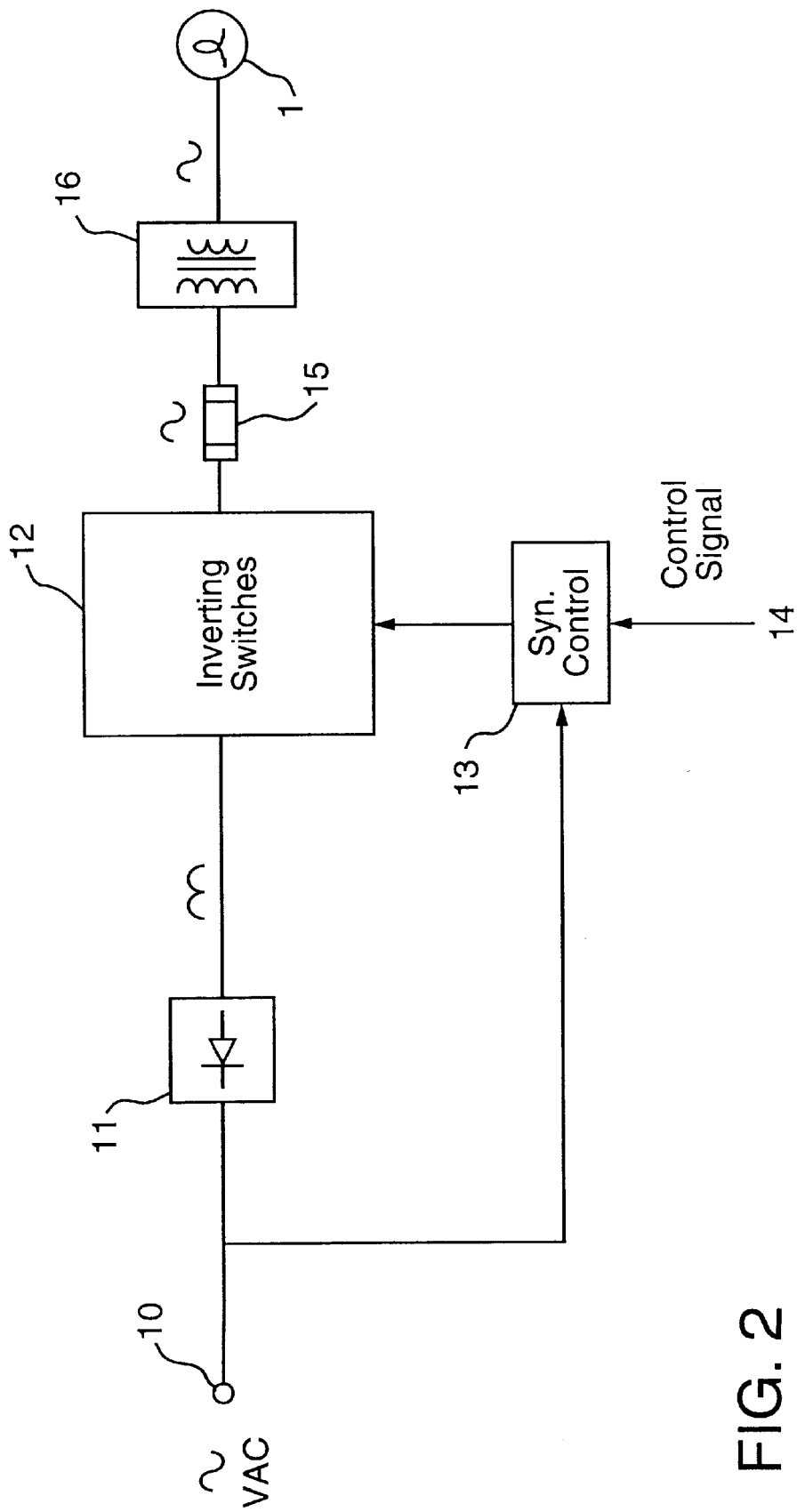
FIG. 2 shows a block diagram for an embodiment of the invention.

FIG. 2 shows a block diagram of an embodiment of the invention. The singleline diagram shows an AC power input at 10. In this embodiment the input is a sine wave, because in most instances it will be desirable to utilize a sine wave which is readily available and which has desirable characteristics to the load. The AC incoming power 10 is rectified in a rectifier 11. The output of the rectifier is a pulsating DC signal which generally conforms to the appearance of a sine wave characteristic, both positive and negative pulses occurring with only a single polarity. This rectified sine wave is then fed to a synchronizing inverter 12, which contains switches, which can selectively permit either no current output or an inverted output which reconstructs the initial AC sine wave. This is done by utilizing a synchronization control 13. When a control signal is received at 14, indicative of desiring to power the load device, such as a lamp filament, the synchronization control operates the inverting switches 12 to provide an AC output. The power fed to the load transformer 16 is monitored by a current sensing device such as a fuse 15. Although a fuse will be shown in the preferred embodiments, it is to be understood that other current sensing devices could equally be used. However, utilization of a fuse has some desirable characteristics, in that it is generally a vital device, low cost and is a very small, easily replaced component.

The current sensing device, fuse 15 as shown in FIG. 2, is between the inverting switches 12 and the lamp transformer 16. It is to be understood that, in other embodiments, the fuse may be placed anywhere from the incoming AC power 10 to the lamp control transformer 16. A current sensing device or fuse in such an installation will detect a rise in current and interrupt the power to the lamp. In some applications a decrease in the low voltage lamp circuit between the transformer and the filament may also be used to detect failed conditions. As shown in FIG. 2, the output of transformer 16 is fed to a load, in this case a single light filament. It is understood that other loads or multiple loads could be connected in certain embodiments. The device is capable of driving any typical load on the output of the transformer 16.

Initially, an AC source is first full-way rectified and then reassembled into a sine wave by synchronized switches. Inverted power is then fed into a transformer. Generally, transformers are designed such that the impedance looking into a transformer is largely a reflection of the load on the secondary at or near the frequency for which magnetic saturation is not a factor of significance. At lower frequencies or when the primary of a transformer is excited by a composite waveform with a DC component, magnetic saturation upsets the efficiency of the power transfer. The result is the impedance of the transformer is significantly reduced. As a result, when a significant DC component is placed on the primary of the transformer, an increase in current draw is experienced. This increase in power can then be detected by a current sensing device such as the interruption operation of a fuse. The value of the fuse can be chosen so as to permit normal operation but to sense a failed component by reacting to an overcurrent situation, brought on by a DC component being fed to the transformer. As the DC component sees a significantly reduced impedance, the current is generally limited by the resistance of the windings of the transformer, which is generally relatively small. Therefore, the current during a DC component will be significantly higher than the normal operating AC current, thereby causing the fuse to blow. In FIG. 2 the synchronization control is also fed off the AC power line 10, so that it can be in precise synchronization with the inverted signal from the rectifier 11. As a result, the switches can be operated in a generally zero-cross mode.

Figure 3:
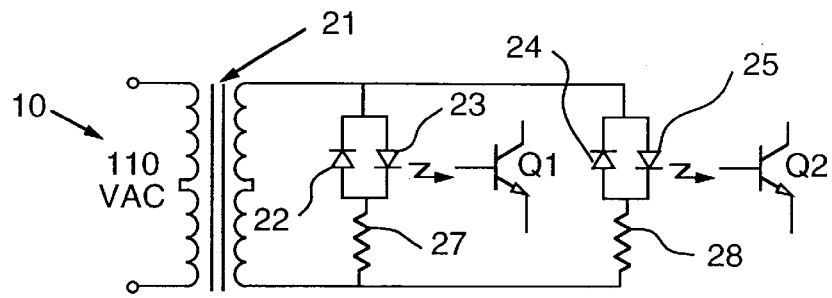
FIG. 3 shows a circuit diagram for a portion of a synchronization control.
Figure 4:
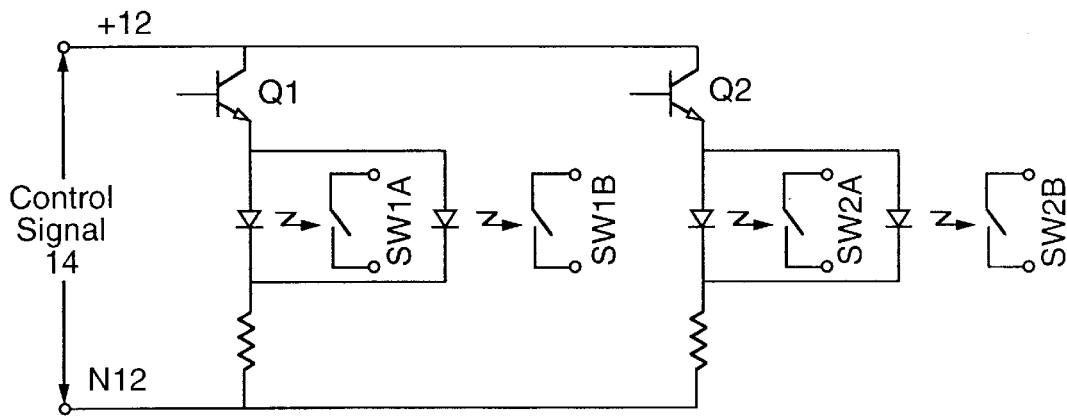
FIG. 4 shows a portion of the synchronized inverter which can be used with the circuitry of FIG. 3.
Figure 5:
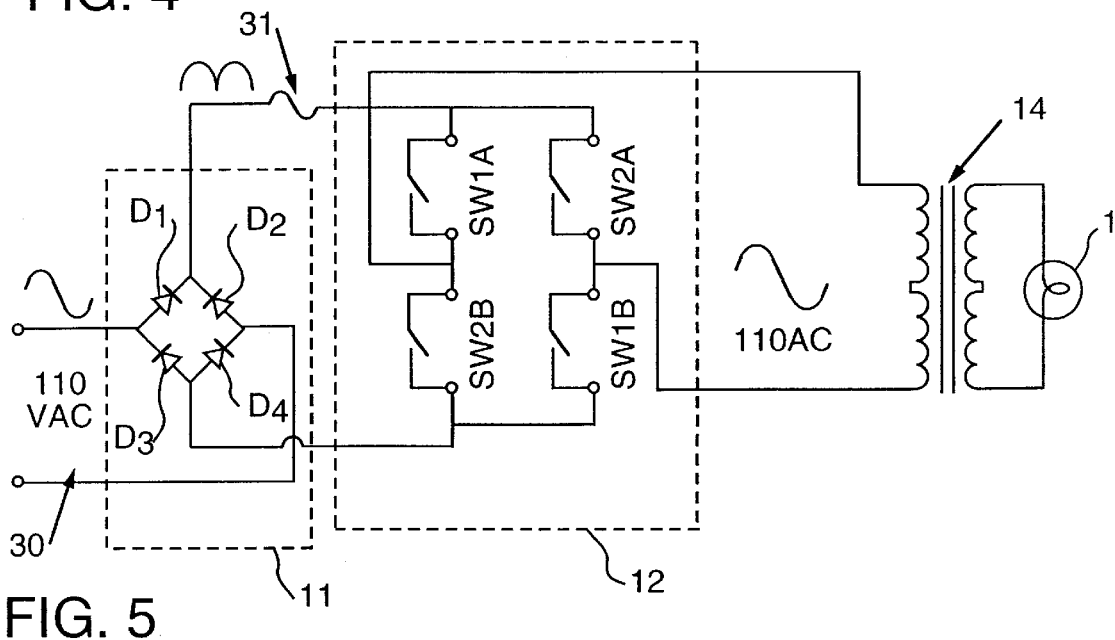
FIG. 5 shows an embodiment of the invention which can utilize the synchronized inverter of FIGS. 3 and 4.

FIG. 5 shows a simplified circuit diagram utilizing the principles shown in the block diagram of FIG. 2. It is noted, however, that fuse 31 is now placed between the rectifier 1l1 and the inverter switches 12. As previously discussed, the position of the fuse here will operate quite satisfactorily in its detection of higher-than-normal current drawn by the transformer 14 primary when the power provided has a DC component. As can be seen by the position of switches SW1A, SW1B, SW2A and SW2B, should any switch fail in either an open or closed mode, a DC component is imposed on the primary of transformer 14. As has previously been discussed, the DC component will cause an increase in current to the transformer. The operation of AC input 30 is fed to a rectifier 11. Rectifier 11 may be any type of rectifier, a typical full wave bridge using diodes $D_1$–$D_4$ has been shown. Output is then a the waveform as shown coming to fuse 51 which is sized to indicate an abnormal current. To reconstruct the AC wave as shown in FIG. 5 at the primary of transformer 14, switches SW1A, SW1B, SW2A and SW2B are synchronized for the generally zero-cross points to selectively permit pulses on the rectified input to the inverter to be passed in an alternating manner. One of the other objects of this invention is to provide a vital means to ensure a railway signal lamp is off when the DC control voltage is off without regard to component failures. In addition, the DC input voltage is used to turn on the AC power to illuminate the lamp. The circuit provides an assurance that no component failures can result in a lamp being "on" when the DC control signal is "off", With the DC control signal "off", it is possible that one or more of the switches in FIG. 5 could erroneously assume an "on" state. The mechanism for such a failure may be of various natures; however, it is sufficient to recognize the potential for such an occurrence in a failed mode. With the DC control voltage "off", four switches in FIG. 5 would normally all assume the open or "off" state, and the signal lamp 1 would not be illuminated. Assuming either of the paired switches, SW1 (A and B) or SW2 (A and B), fail to the "on" state, such an occurrence will produce a half wave rectified excitation of the transformer 14. With half wave excitation there exists a significant DC component. Momentarily the lamp may illuminate, but excessive current produced by the DC excitation current of the transformer 14 will cause the fuse 31 to open and return the lamp to the "off" or unilluminated state. Should any of the switches in FIG. 5 fail in the open state, full inversion will not occur and there will still be a DC component driven when the command signal is in the "on" state. In many applications it will be desirable to have the fuse sized to blow in this condition, so as to indicate a partial failure of one of the components in the system. In addition, because the power available through the half wave rectification may be insufficient or low in the output of transformer 14, the lamp may fail to fully illuminate. Therefore, in many applications it will be desirable that the fuse also blow or interrupt in this condition. While the embodiment shown in FIG. 5 can utilize any type of switches in the inverter 12, FIGS. 3 and 4 show circuits which can be used to control optically coupled switches, and synchronize them with the rectified waveform shown at fuse 31. FIG. 3 utilizes a step-down transformer 21, which is fed by 110-volt AC power. Transformer 21 feeds two optically coupled transistors Q1 and Q2. Load resistors 27, 28 limit the current in each of the switching transistor paths. Diodes 22 and 23 operate with Q1 to provide it an alternative "turn-on", "turn-off" function in synchronization with the alterations of the 110-volt AC sine wave. Similarly, diodes 24 and 25 operate with the optically coupled transistor Q2 to provide it to alternatively "turn off" and "on" that is 180° from Q1.

Transistors Q1 and Q2 of FIG. 3 are shown in their circuit relationship to operation of the switches in FIG. 4. Control signal 14, such as would be available in a railway signal operation, is selectively applied at terminals (+12, N12) as control signal 14. Such a signal may, in fact, be a +12 volt output signal from signal equipment such as a Microlok unit provided by Union Switch & Signal Company of Pittsburgh, Pennsylvania. As shown, transistor Q1, when it synchronously turns "on", provides for optically coupled SW1A and SW1B to close and conduct. Both SW1A and SW1B operate as a pair, both being "on" for the same one-half cycle of the AC wave. Similarly, transistor Q2 operates SW2A and SW2B as a pair, both being "on" during the same half cycles of the AC wave. As can be understood since Q1 and Q2 are alternatively "on", therefore, switch pair SW1A-B and SW2A-B are on alternative half cycles. The pairs of switches can then be used to reconstruct a sine wave from a full wave rectified input as shown at the input to the inverter 12 of FIG. 5. Viewing FIG. 5, it is seen that switch pair SW1A and SW1B, operating simultaneously, provide inversion of one pulse of the rectified AC signal, while the alternative pulse is provided through switch numbers SW2A and SW2B. The switches of inverter 12 in essence flip back and forth at the zero-crossing point of the AC incoming sine wave. While it is desirable that the switches in inverter 12 close at the zero-crossing point for synchronization of their current interruption capability, it is understood that satisfactory operation can be had as long as they maintain an alternative cycling rate, so as to reconstruct a wave having a minimum DC component.

While FIGS. 3 and 4 have shown one way to create a synchronized inverter, other embodiments of the invention may use other synchronized inverters.

Figure 6:
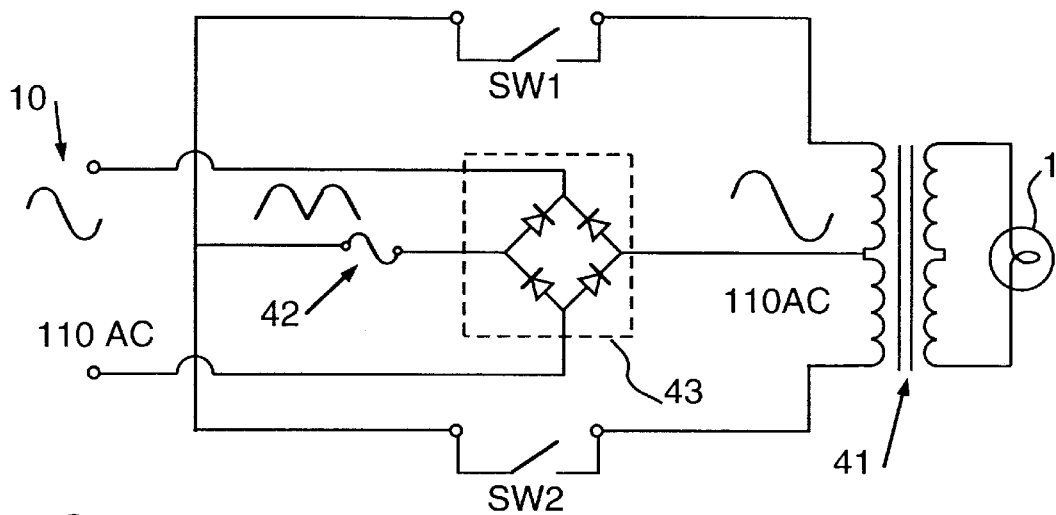
FIG. 6 shows an embodiment of the invention utilizing a center tap transformer.

While certain embodiments have been shown in FIGS. 2–5, it is to be understood that other embodiments may also utilize this method. While the FIGS. 2–5 have shown certain embodiments of the invention, it is anticipated that other embodiments may be utilized as a practical implementation of the invention. These previously discussed embodiments utilized two wires to each signal transformer and a signal head, or what is equivalent to a double-brake configuration. Only a single brake is necessary in the arrangement, such as has been shown in FIGS. 1a and 1b. While there may be some advantages to a double-brake system, there are often cost advantages to having only a single-brake system to each driven load. FIG. 6 is an embodiment in which only two switches need be utilized to act as an inverter. While the prior embodiments have used a bridge arrangement for the inverter composed of four switches, the embodiment of FIG. 6 utilizes a center tap transformer and only two switches, SW1 and SW2, to achieve a synchronized inverter. As in prior embodiments a 110-volt incoming signal of power is supplied at 10. A rectifier 43 causes the AC signal to be a rectified sine wave which is fed through synchronizing switches SW1 and SW2 and fuse 42. Fuse 42 functions as previously described to interrupt current above the predetermined operating level. Switches SW1 and SW2 in FIG. 6 operate to synchronously invert the rectified DC into a reconstructed sine wave. The reconstructed sine wave is fed through the center tap arrangement of transformer 41. The output of transformer 41 is fed to the load, which in this instance is also shown as a lamp filament 1. If either SW1 or SW2 fails in a closed position, with the control "on" or "off", a DC component will result at the primary of transformer 41. In a failed condition with the control "on", if SW1 or SW2 is open, a ½ wave DC wave is delivered to the transformer which will cause the fuse to open. The DC component on the primary will result in a rise in primary current which can then be sensed by fuse 42. This embodiment was chosen, for simplicity, to show a lamp filament 1 as a load. However, it is to be understood that in practicing the invention other devices may also be used as the load in place of the filament 1. Although the filament 1, as shown, is being driven by reconstructed AC sine wave, it is understood that the load on the transformer could also include a rectifier to drive DC devices. When used to drive DC devices through a downstream rectifier, the primary and secondary current in normal operation through transformer 14 will still be AC or sinusoidal. During operation of the circuit using a center trap transformer, FIG. 6, the two synchronized switches, SW1 and SW2, operate in a push-pull arrangement In this arrangement, SW1 and SW2 turn "on" and "off", alternately connecting one-half of the primary to the rectified source and then the other half of the primary to the rectified source. As with the bridge arrangements previously shown, shorting of any one switch (SW1 or SW2) with the DC control mechanism "off" will momentarily provide current to the load 1. However, because there is a DC component, the fuse 42 will open and restore the lamp to the proper "off" condition.

Figure 7:
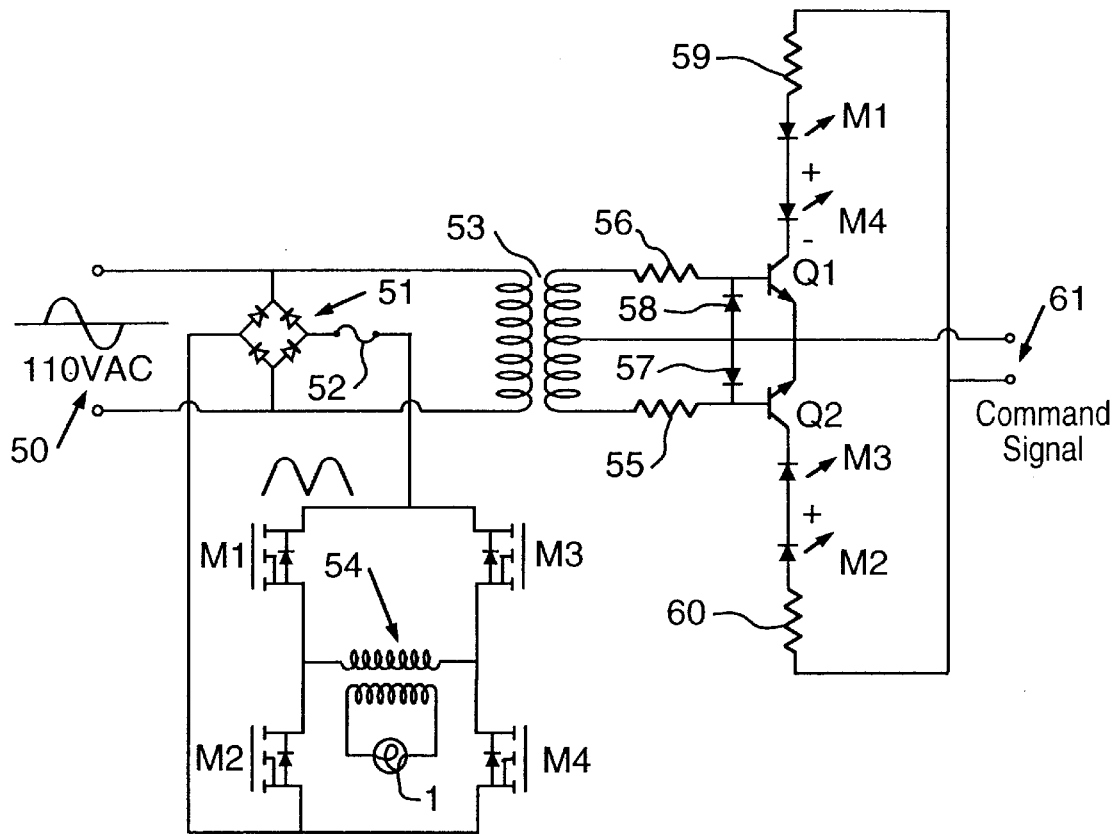
FIG. 7 shows an embodiment of the invention using solid state optically coupled switches.

FIG. 7 illustrates another embodiment of the invention The transformer 53 is fed from a sinusoidal AC input 50. Output of transformer 53 is a split secondary, which provides base drive for transistors Q1 and Q2 through respective resistors 56 and 55. When a command signal is present at 61 such that a negative voltage is present at the junction between Q1 and Q2, resistors Q1 and Q2 will switch "on"and "off" on alternative half-cycles of the incoming line which is imposed across respective diodes 58 and 57. Optically coupled switches M1 and M4 are operated when transistor Q1 is turned "on". Resistor 59 is used to control the current during the "on" position. Normally, in halfcycles, when Q1 is off, Q2 is on and similarly activates optically coupled switches M2 and M3 through resistor 60. Switch elements of M1–M4 are in the power inverter side and are fed from the rectifier 51 in a bridge arrangement. The inverter feeds the primary of the transformer 54. In the bridge inverter, switches M1 and M4 provide a current path through the primary of the lamp-driving transformer 54 while switches M3 and M2 provide an alternative polarity pathway. The previously rectified sine wave from rectifier 52 is reconstructed in the bridge arrangement of switches M1–M4. As such, a sine wave is fed into the primary of 54 in response to a command signal at 61. This results in the lamp or other load 1 being powered in response to the command signal 61. Should any one of switches M1–M4 fail in either an open or a closed-circuit mode, a DC component will be fed to the primary of transformer 54. An increase in current from a DC component to the primary of transformer 54 will be sensed by a current sensor, such as fuse 52 in FIG. 7.

The full wave power inverter circuit can utilize four optically coupled FET switches, M1–M3, which are arranged in a bridge configuration. The top side of the bridge is positive relative to the lower side. In the center of the bridge, the step-down lighting (load) transformer 54 is connected. On one-half cycle switches M1 and M4 are in an "on" state and the "W" end relative to the "E" end of the transformer is excited by a positive half-cycle of a sine wave. On the next occurring half-cycle, switches M2 and M3 are in the on state, and the "W" end relative to the "E" end of the transformer is excited by a negative half-cycle of a sine wave. Thus, through the action of the synchronization of the switching elements M1–M4, a sine wave is reassembled at the primary of the lighting transformer 54. If the command signal is not present, neither set of paired switches M1, M4 or M2, M3 operates, and the lamp is held in the "off" position. Choice of the fuse is important for the proper detection of DC currents. They can be chosen by considering the possibilities of paired switches being shorted when the command signal is in the "off" position. For example, if switches M1 and M4 were to short, the transformer would be connected to a full wave rectified source. In such a case, the transformer 54 will draw excessive current because it is connected to a high DC component source. The fuse 52 will open the circuit and ensure that the load 1 is "off". Technically, in a 10:1 step-down primary, current in the lamp transformer 54 can be about 0.3 amperes. When the transformer is subjected to full wave or half wave excitation, the current may exceed 5 amperes. Thus, a circuit protected with a 1-amp. fuse can easily open when a set of switches becomes shorted. If the circuit were not fused or other current protection device utilized, the lamp may illuminate even with the transformer when it is excited with a full wave rectified AC. In some embodiments it may be desirable to have the inclusion of a series resistor such as 10 ohms in series with the primary, so the fuse will open without causing any damage to other components when the leads are shorted.

Figure 8:
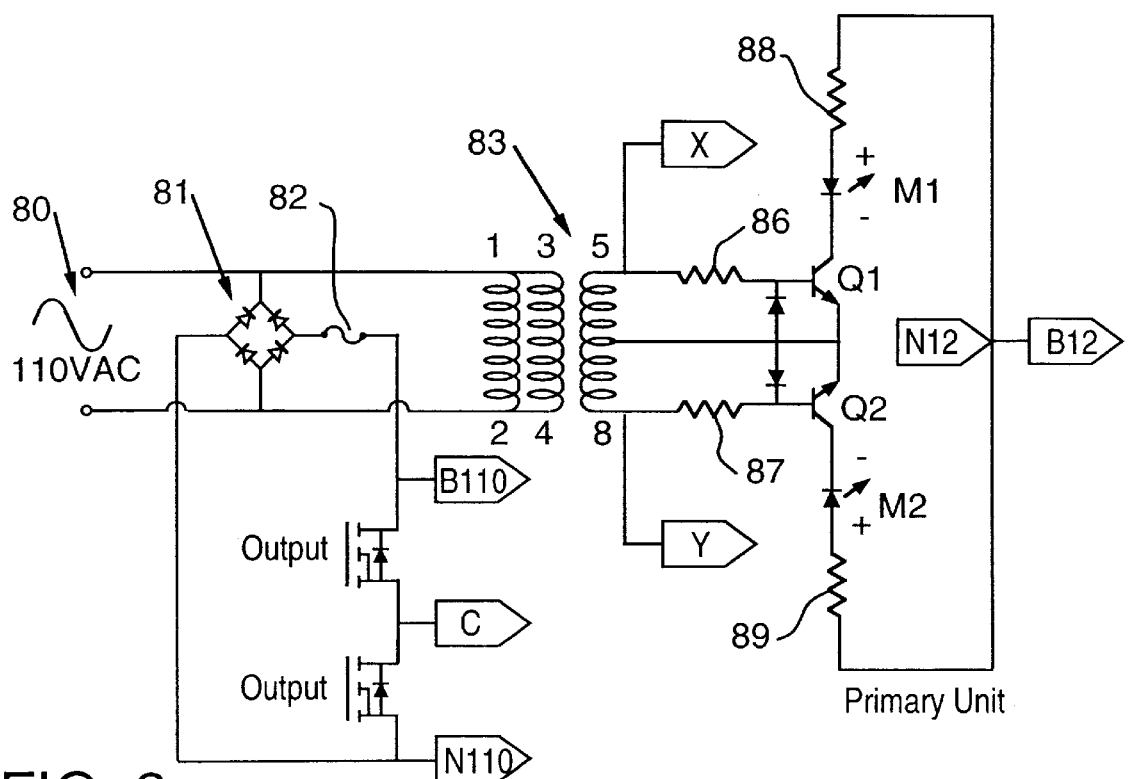
FIG. 8 shows one embodiment of a primary unit having the rectifier section and half of the inverter section.
Figure 10:
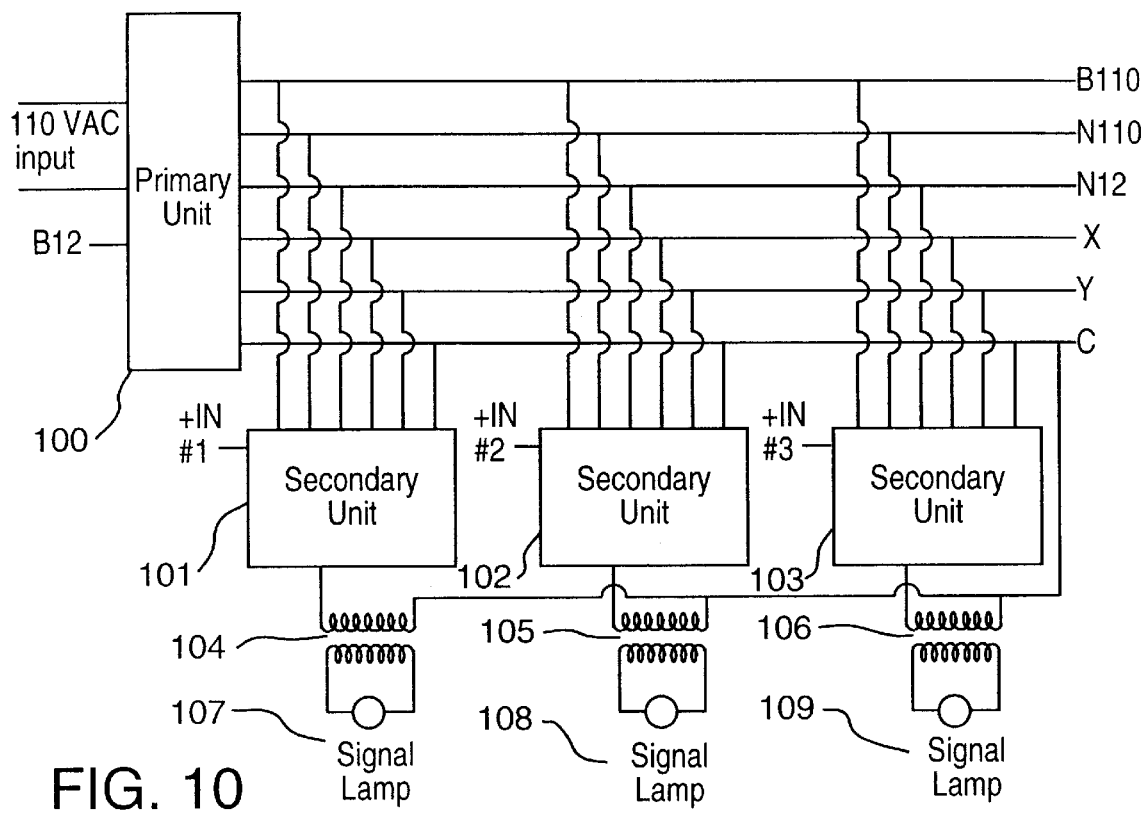
FIG. 10 is a block diagram of an embodiment utilizing a single primary unit and multiple secondary units.

FIG. 8 shows a system which utilizes a primary unit with sufficient capacity to serve as half of a bridge common to many load or lamp circuits. An incoming AC power is supplied at 80, to feed a rectifier 81. Rectifier 81 provides a full wave rectified output across terminals B110 and N110. This rectified output includes current sensor or fuse 82. A primary unit also includes a synchronization circuit for one-half of the inverter bridge, namely M1 and M2. A transformer 83 provides control to the synchronization circuitry. Control signal inputs N12 and B12 are used to control transistors Q1 and Q2. Power to transistors Q1 and Q2 is fed through resistors 86 and 87, respectively. When Q1 operates, switch M1 is activated through resistor 88; and alternatively, when Q2 operates, switch M2 is fed through resistor 89. There are two output switches, M1 and M2, which are arranged in a circuit forming one-half of the inverter bridge. Particularly, they are feeding one-half of the bridge circuit at output C, with B110 and N110 being the feeds to the other half of the bridge which will utilize switches M3 and M4. As an example, modules M1 and M2 could be Crydom Model D4D07 units. Such units are rated at 7 amperes, 400 volts, and controls and outputs are isolated at 2,500 volt AC. Switches M1 and M2 are turned "on" at alternate half-cycles of the sine wave, thus point C is alternatively connected to B110 and then to N110. As shown, the primary inverter bridge toggles C continuously because control signal N12-B12 is applied. In many applications where it is desirable to operate all the lights to an "off" condition from a single point, N12-B12 can be controlled from a unit such as a Microlok or other logic device. Control of the inputs to N12-B12 could be used to turn all of the devices to an "off" state. Each individual device will be controlled by an individual control source shown as (+) control. In the embodiment of FIG. 10 there would be one primary unit which provides half of the inverter bridge and therefore would be rated to have that half of the inverter bridge operate at a current level consistent with a plurality of secondary units. The secondary unit would have its own separate one-half of its respective inverter bridge. As such, the control in the secondary unit will appear to be more of a single-brake circuit.

Figure 9:
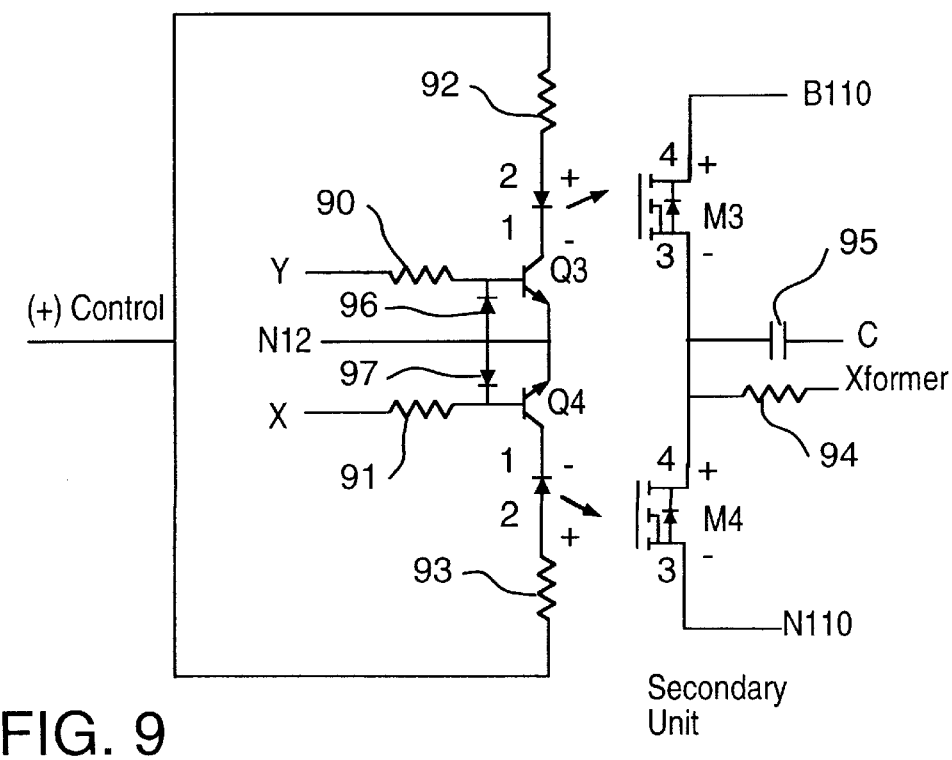
FIG. 9 shows a secondary unit having a second portion of the inverter unit.

FIG. 9 shows a secondary unit that could be used with the primary unit of FIG. 8. As will often be done, multiple secondary units can be utilized with a single primary unit. Each secondary unit will feed a single lamp or load transformer. Synchronizing center tap transformer 83 is utilized by all of the secondary units through its outputs, x and y, being available to each secondary unit. A typical control transformer 83 may be a Stancor Model LB612. Resistors 86 and 87 can have a value such as 1k, while the current-limiting resistors in the primary unit, 88 and 89, may have a value of 470 ohms, for example.

The schematic diagram of the secondary unit shown in FIG. 9 can use switches such as Aromat Corporation's Model AQZ104. This unit is rated at 0.7 amperes and 400 volts. Both control and output in such unit are isolated at 2,500 VAC. As previously described, a secondary unit such as FIG. 9 is required for each lamp or load that is to be activated. The secondary unit will have its own control signal input, identified as +CONTROL in FIG. 9. Inputs x and y in the secondary unit are connected to points x and y in the primary unit of FIG. 8. As such, the output of the control transformer 83 is fed through resistors 90 and 91 (typically 1k ohms). Signals x and y alternatively drive Q3 and Q4, as the input signals x and y are fed across opposite polarity diodes 96 and 97. As transistors Q3 and Q4 turn it "on" and "off", optically coupled switches M3 and M4 are activated through respective resistors 92 and 93 (460 ohms, for example). M3 and M4 in the secondary unit as shown in FIG. 9 operate as the other two switches in the inverter bridge, with switches M1 and M2 in the primary unit. As such, control of M3 and M4 through the signal "+CONTROL" provides for the synchronized inversion to the specific lamp transformer attached to the secondary unit. Resistor 94 can be a current limiting resistor such as, for example, 10 ohms, which is connected to the specific load transformer for the given secondary unit through a fuse. The fuse in the control transformer primary may have a value such as 0.75 amperes. This fuse would act to both interrupt the power to the lamp transformer during a failed mode and protect switch elements M3 and M4. Capacitor 95, having a value such as 0.1 micro farads can also be connected across common point C of the primary unit. This, in effect, places a capacitance across each transformer primary. This is done so as to protect the circuitry from operation when the lamp or load has been removed. During a removed load operation, the output is switching an inductive load (the transformer), and the induced inverse voltage could put stress on the switches M1–4 if it were not for the capacitance, 95.

FIG. 10 shows an apparatus using a single primary unit and a plurality of secondary units to drive individual devices. As shown in FIG. 10, a primary unit 100 is connected to three secondary units 101, 102 and 103. Each secondary unit, in turn, drives its own respective transformer 104, 105 and 106. The secondary of each load transformer is connected to its own load, such as, for example, signal lamps 107–109. The embodiment shown in FIG. 10 would normally have each individual fuse for the specific load contained in its secondary unit in series with the respective lead that connects to the primary of the individual load transformers 104–106. A number of secondary units can be attached to a single primary unit; the only limitation would be the capacity of the primary unit. For example, in a lamp load circuit where each load equals 25 watts at 10 volts, the number of secondary units could be as high as 20 lamps. Inputs to the primary unit are 110-volt AC, N12 and B12. The 110-volt could be 50, 60 Hz or any other desirable frequency. As previously discussed, if there is a desire to control all of the units to a "turnoff" state, then input B12 could be controlled from other control circuitry such as Microlok Logic Unit. The outputs from the primary unit are B110, N110, C, x, y. Each secondary unit will activate a lamp from a control signal indicated as "+IN". In each secondary unit has its own individual input. However, as can be understood, many of these inputs could be interrelated. While the secondary transformer voltage available to the signal lamps may be of any value desired, typically they could be adjusted by taps on the respective load transformers. While it is envisioned that the loads would be normally of a low voltage, other voltages and transformers having a 1:1 ratio or even a step-up transformer could be utilized. In some applications it may be desirable to have a series resistor such as, for example, 10 ohms, in series with each transformer primary; such a resistor may result in more voltage drop (typically about 3 volts) than would be the case if the lamps were controlled by a vital relay contact. Therefore, secondary load transformer taps may be desirable. The circuitry shown in FIG. 10 provides additional advantage over vital relays in that each secondary unit is constructed with an external fuse for its particular connected load device, which provides a short-circuit protection unavailable when the circuit is used with a traditional vital relay. The same external fuse that detects DC excitation also can act as short-circuit protection. In FIG. 10, the secondary units themselves could be standard modules that could be individually plugged in. As such, it would permit standard packaging and configurations for utilization with specific lamps or loads. In many applications it will be desirable to configure the packaging through the utilization of DIN rails, with compatible primary and secondary units as required for specific applications. As such, the plug-in of different standard secondary modules can provide a variety of load applications.

Figure 11A:
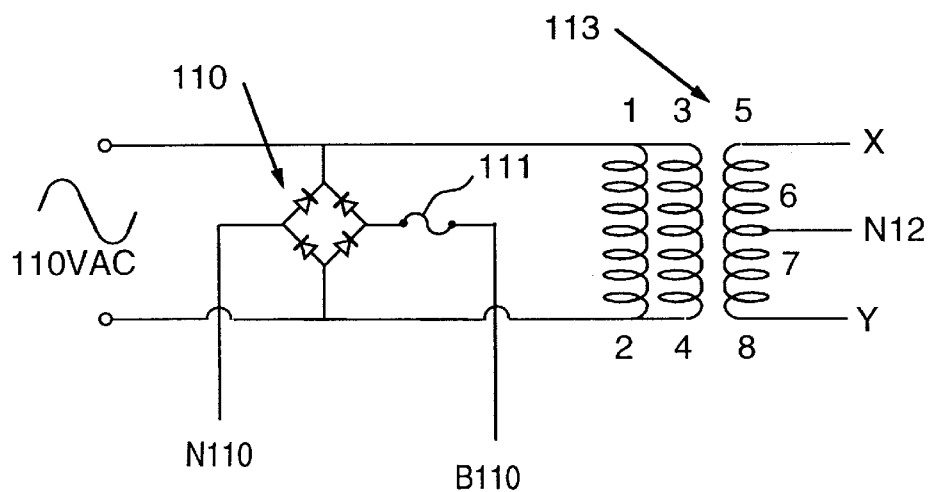
FIGS. 11a and 11b are circuit diagrams of another embodiment utilizing a rectifier and center tap transformer unit with a synchronize inverter for each lamp load.
Figure 11B:
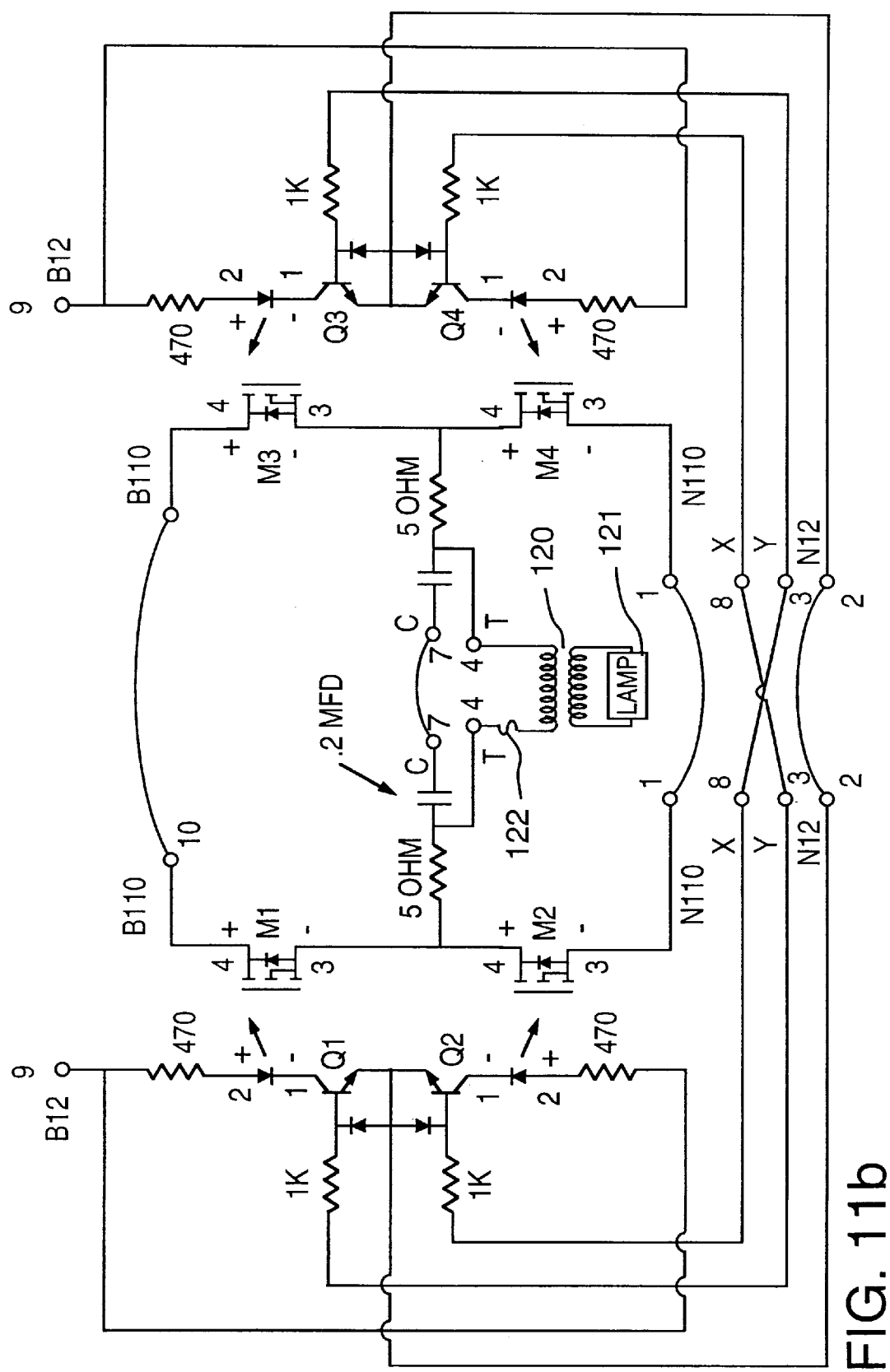

While the embodiments of FIGS. 8, 9 and 10 envision a primary unit having the full wave rectifier and one-half of the synchronized inverter, other embodiments are also possible. FIGS. 11a and 11b show an embodiment using only a control transformer and rectifier in the primary unit. Each secondary unit would include the synchronization and inverter for its respective load transformer. As such, one primary unit, such as shown in FIG. 11a, could be used with multiple secondary units, as shown in FIG. 11b. In the primary unit of FIG. 11a, an AC input wave is rectified by a full wave bridge 110. The current sensor or fuse 111 is contained in the output on the bridge 110. The primary unit would be rated full current in the rectifier section, 110, to handle a plurality of secondary units. Similarly, the fuse 111 would be chosen to detect the increased current from a DC component in one of the secondary unit fed load transformers. Center tap synchronizing transformer 113 is also contained in the primary unit, as shown in FIG. 11a. The center tap transformer 113 provides the synchronizing transistors in each of the secondary units with its synchronization signals.

FIG. 11b shows a secondary control module such as would be available for each load that is desired to be controlled. Many of the components shown in FIG. 11b, with the exception of the transformer and individual load, would be desirable to have constructed in a single module unit. In other embodiments, even the load transformer could be constructed in an appropriate module. However, where the distance between the secondary module and the load is quite far, it would be desirable to run the higher output voltage from the secondary unit to a transformer located at the load, such as a transformer mounted with a signal lamp.

The secondary module shown in FIG. 11b will be seen to operate similarly to those described earlier. Transistors Q1–Q4 control respective optically coupled switches M1–M4. Switches M1–M4 could be, for example, AQZ 104 switches from Aromat Corp. The elements shown in FIG. 11b are for the synchronized circuitry, which would be located in the secondary module. As such, the switches M1–M4 could be identical, as they control only a single load and need only be sized for that one single load, 121.

FIG. 11b shows an external fuse 122 which feeds the load control transformer 120. Transformer 120 will often be a step-down transformer which then feeds into a load 121, such as a lamp, as shown. While fuse 122 is shown on the primary of the transformer 120 as an external fuse, it may be desirable to have the specific primary fuse contained within the module that makes up the secondary unit or at the primary side of the transformer with the remote lamp. It is a choice dependent upon the specific application and the most convenient way to access the fuse.

While a number of embodiments have been shown and discussed, it is to be understood that the invention comprises the method inherent in all of the embodiments. Specifically, the vital load driving method includes the steps of rectifying an AC power source, inverting the rectified AC power in response to a control signal, feeding the inverted power to a transformer, feeding a connected load from the secondary of the transformer and detecting changes in the circuit resulting from the presence of DC current in the transformer primary. Specific methods include utilizing switches that are synchronized from the same AC source to invert the previously rectified current, and detecting current increase by a blown fuse.

Circuit changes may be sensed by an increase in current to the transformer primary, and specific embodiments utilize current sensing may include interruption of the circuit through operation on a fuse. Inverting may be made through the use of synchronization, using a center tap transformer and optically coupled solid state switches. In some embodiments the method may utilize a rectifier that feeds a number of inverting steps for individual loads.

While a number of embodiments have been shown and described herein, it is understood that the invention includes other embodiments not shown which can be derived from an understanding of the invention or which are covered by the following claims.

What is claimed is:

1. A vital load driver for supplying power to a load;
   (a) a fail-safe circuit comprising a rectifier for full wave rectification of an alternating current power;
   (b) a synchronous inverter for assembling a waveform from the rectified output of said rectifier said synchronous inverter further including,
      a synchronizer controlling the output of said synchronous inverter in response to a control signal to have a phase relationship generally corresponding to said alternating current power, first and second sets of paired switches, said switch sets being connected in said synchronous inverter so that in a first half-cycle of said alternating current power, said first switch set is in an "on" position and said second switch set is in an "off" position, and in a next occurring half cycle of said alternating current power, said first switch set is in an "off" position and said second switch set is in an "on" position, said switch sets being configured so that if said control signal is not present, neither said set of switches operates and said secondary of said transformer does not feed said load;
   (c) a transformer having a primary fed from the output of said synchronous inverter and secondary feeding said load; and,
   (d) a current sensor for detecting an increase in current resulting from a DC component being fed to said transformer.

2. The vital load driver of claim 1 said current sensor further comprising at least one fuse.

3. The vital load driver of claim 1 further comprising said current sensor intermediate said transformer and said inverter.

4. The vital load driver of claim 1 further comprising said current sensor intermediate said rectifier and said inverter.

5. The vital load driver of claim 1 further comprising a capacitance in parallel with the primary of said transformer.

6. The vital load driver of claim 1 further comprising:
   (e) a primary unit having at least a portion of said inverter rated to supply a plurality of loads;
   (f) at least one secondary unit having at least a portion of said inverter rated to handle at least one of said loads.

7. The vital load driver of claim 6 wherein said primary unit includes a portion of said inverter rated to supply said plurality of loads.

8. The vital load driver of claim 1 wherein said inverter further comprises a bridge circuit having four switch devices.

9. The vital load driver of claim 8 wherein said switch devices of said bridge circuit are switched to reconstruct a sine wave output generally corresponding to said alternating power.

10. The vital load driver of claim 1 wherein said synchronizer comprises at least two transistors alternately turning on and off respective pairs of switch devices in a bridge circuit.

11. The vital load driver of claim 1 further comprising:
    (e) a primary unit having at least a portion of said inverter rated to supply a plurality of loads;
    (f) at least one secondary unit having at least a portion of said inverter rated to handle at least one of said loads.

12. The vital load driver of claim 11 wherein said primary unit has a rectifier rated to supply all of said loads; and said secondary units includes an inverter rated to supply respective one of said loads.

13. The vital load driver of claim 11 wherein said primary unit includes said rectifier and half of a bridge circuit, said bridge circuit comprising said inverter.

14. The vital load driver of claim 1 wherein said inverter comprises an inverter having an output that is generally sinusoidal.

15. The vital load driver of claim 1 further comprising an impedance in series with said transformer.

16. The vital load driver of claim 15 wherein said impedance includes a resistance.

17. A method for supplying power to a load in response to a control signal comprising:
    (a) in a fail-safe circuit, rectifying an alternating current power source to produce a rectified sine wave;
    (b) inverting said rectified sine wave producing an alternating current output;
    (c) synchronizing said output from said inverting step in response to a control signal to provide said output with a phase relationship generally corresponding to said alternating current power source;
    (d) feeding said inverted alternating current to a load transformer;
    (e) feeding said load from said transformer;
    (f) detecting current increases to said load transformer; and
    (g) switching, in conjunction with said inverting and synchronizing steps, in a first half-cycle of said alternating current power, a first switch set to an "on" position and a second switch set to an "off" position and switching, in a next occurring half-cycle of said alternating current power, said first switch set to an "off" position and said second switch set to an "on" position; and,
    (h) if said control signal is not present, discontinuing operation of said switch sets and interrupting power to said load transformer in response to increases in said load current above a predetermined level.

18. The method of claim 17 for supplying power to a load wherein said inverting further comprises producing said output as generally a sinewave corresponding to said power source.

19. The method of claim 17 wherein said detecting current and said interrupting is provided by operation of a fuse.

20. The method of claim 18 wherein said detecting current and said interrupting is provided by operation of a fuse.

* * * * *

UNITED STATES PATENT AND TRADEMARK OFFICE
CERTIFICATE OF CORRECTION

PATENT NO. : 6,108,220  
DATED : August 22, 2000  
INVENTOR(S) : Raymond C. Franke Page 1 of 1

It is certified that error appears in the above-identified patent and that said Letters Patent is hereby corrected as shown below:

Column 1,
Line 10, insert a space between "vital" and "means".

Column 2,
Line 43, after "2", insert a -- . --. "FIG. *1b*" starts a new paragraph.

Column 3,
Line 60, "1I1" should read -- 11 --.

Column 6,
Line 5, place a --. -- after arrangement.
Line 26, insert a -- hyphen(-) -- after "half".

Column 8,
Line 21, insert a space between ""+CONTROL"".

Signed and Sealed this

Twenty-ninth Day of January, 2002

Attest:

*Attesting Officer*

JAMES E. ROGAN
*Director of the United States Patent and Trademark Office*